US012019291B2

(12) United States Patent
Kazav et al.

(10) Patent No.: US 12,019,291 B2
(45) Date of Patent: Jun. 25, 2024

(54) NETWORK INTERFACE DEVICE HAVING A FRAME WITH A SLOPED TOP WALL PORTION

(71) Applicant: Mellanox Technologies, Ltd., Yokneam (IL)

(72) Inventors: Yaniv Kazav, Yokneam (IL); Andrey Ger, Yokneam (IL); Nimer Hazin, Yokneam (IL); Igal Gutman, Yokneam (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 25 days.

(21) Appl. No.: 17/977,103

(22) Filed: Oct. 31, 2022

(65) Prior Publication Data

US 2024/0142730 A1 May 2, 2024

(51) Int. Cl.
*H04B 10/00* (2013.01)
*G02B 6/42* (2006.01)

(52) U.S. Cl.
CPC ......... *G02B 6/4284* (2013.01); *G02B 6/4256* (2013.01); *G02B 6/4269* (2013.01)

(58) Field of Classification Search
CPC ... G02B 6/4284; G02B 6/4256; G02B 6/4269
See application file for complete search history.

(56) References Cited

U.S. PATENT DOCUMENTS

| | | | | |
|---|---|---|---|---|
| 7,264,406 B1* | 9/2007 | Yoshikawa | .......... | G02B 6/4201 385/88 |
| 7,841,887 B2 | 11/2010 | Zhang et al. | | |
| 8,597,045 B2 | 12/2013 | Zhu et al. | | |
| 8,714,839 B2* | 5/2014 | Ito | .............. | H01R 13/6581 385/139 |
| 8,870,471 B2* | 10/2014 | Ito | .............. | G02B 6/4269 385/88 |
| 8,967,884 B2* | 3/2015 | Kondou | .............. | G02B 6/4246 385/92 |
| 9,039,300 B2* | 5/2015 | Kondo | .............. | G02B 6/426 385/92 |
| 9,039,301 B2* | 5/2015 | Kawase | .............. | H04B 10/40 361/818 |
| 9,042,722 B2* | 5/2015 | Oomori | .............. | G02B 6/4277 398/117 |
| 9,389,368 B1* | 7/2016 | Sharf | .............. | H01R 13/6587 |
| 9,620,907 B1* | 4/2017 | Henry | .............. | H01R 13/6582 |
| 9,666,997 B1* | 5/2017 | Henry | .............. | H01R 13/659 |
| 9,668,379 B1* | 5/2017 | Bucher | .............. | H05K 7/20436 |
| 9,958,497 B2* | 5/2018 | Sharf | .............. | H01R 13/717 |
| 9,972,944 B1* | 5/2018 | Long | .............. | H01R 24/30 |
| 10,073,230 B2* | 9/2018 | Wilcox | .............. | H04B 10/40 |

(Continued)

*Primary Examiner* — Agustin Bello
(74) *Attorney, Agent, or Firm* — PEARL COHEN ZEDEK LATZER BARATZ LLP

(57) ABSTRACT

A network interface device which may include: an elongated frame having a first end, a second end, and, between the first and second ends, a top wall, a bottom wall opposing the top wall, a first lateral wall, and a second lateral wall opposing the first lateral wall; wherein the top wall includes: a first longitudinal portion that is adjacent to the first end of the frame; and a second longitudinal portion that is adjacent to the second end of the frame and whose outer surface slopes towards its inner surface in a direction of the second end of the frame.

7 Claims, 8 Drawing Sheets

(56) References Cited

U.S. PATENT DOCUMENTS

| | | | | |
|---|---|---|---|---|
| 10,104,760 B1* | 10/2018 | Briant | | G02B 6/4284 |
| 10,128,618 B1* | 11/2018 | Briant | | H01R 13/04 |
| 10,128,627 B1* | 11/2018 | Kazav | | G02B 6/4269 |
| 10,295,766 B2* | 5/2019 | Chen | | G02B 6/4256 |
| 10,468,823 B2 | 11/2019 | Hsu et al. | | |
| 10,470,313 B1* | 11/2019 | Phillips | | H01R 12/722 |
| 10,617,034 B2* | 4/2020 | Hubahib Gaviola | | |
| | | | | H05K 1/0203 |
| 11,061,194 B2* | 7/2021 | Zhou | | G02B 6/4261 |
| 11,184,995 B2* | 11/2021 | Graham | | G02B 6/44526 |
| 11,199,670 B2* | 12/2021 | Takai | | G02B 6/4284 |
| 11,283,218 B2* | 3/2022 | Qiao | | H01R 13/6592 |
| 11,489,293 B2* | 11/2022 | Balakrishnan | | H01R 12/721 |
| 11,735,852 B2* | 8/2023 | Cartier, Jr. | | H01R 13/65918 |
| | | | | 439/77 |
| 11,876,315 B2* | 1/2024 | Mousa | | H01R 12/75 |
| 2004/0203289 A1* | 10/2004 | Ice | | H05K 9/0058 |
| | | | | 439/607.2 |
| 2007/0167077 A1* | 7/2007 | Mizue | | G02B 6/4245 |
| | | | | 439/607.01 |
| 2009/0148106 A1* | 6/2009 | Moore | | G02B 6/4201 |
| | | | | 361/748 |
| 2009/0211801 A1* | 8/2009 | Edwards | | H05K 9/0058 |
| | | | | 174/377 |
| 2012/0148201 A1* | 6/2012 | Kondou | | G02B 6/428 |
| | | | | 385/92 |
| 2012/0182688 A1* | 7/2012 | McColloch | | H04B 10/40 |
| | | | | 361/692 |
| 2012/0288240 A1* | 11/2012 | Kondo | | G02B 6/426 |
| | | | | 385/92 |
| 2012/0315051 A1* | 12/2012 | Oomori | | G02B 6/4277 |
| | | | | 398/135 |
| 2013/0077920 A1* | 3/2013 | Matsue | | G02B 6/4246 |
| | | | | 385/92 |
| 2013/0136458 A1* | 5/2013 | Kawase | | H05K 9/0058 |
| | | | | 398/135 |
| 2013/0156418 A1* | 6/2013 | Stapleton | | G02B 6/4286 |
| | | | | 398/25 |
| 2013/0251314 A1* | 9/2013 | Ito | | H05K 9/0058 |
| | | | | 385/88 |
| 2014/0286613 A1* | 9/2014 | Ito | | G02B 6/4292 |
| | | | | 385/88 |
| 2014/0334149 A1* | 11/2014 | Nolan | | F21V 31/005 |
| | | | | 362/235 |
| 2015/0201528 A1* | 7/2015 | Lebo | | G02B 6/4269 |
| | | | | 361/703 |
| 2016/0178856 A1* | 6/2016 | Chang | | G02B 6/4246 |
| | | | | 385/92 |
| 2016/0211623 A1* | 7/2016 | Sharf | | G02B 6/4269 |
| 2016/0211625 A1* | 7/2016 | Sharf | | G02B 6/4284 |
| 2017/0264052 A1* | 9/2017 | Henry | | H01R 13/6596 |
| 2018/0049348 A1* | 2/2018 | Bucher | | H05K 7/20445 |
| 2018/0116063 A1* | 4/2018 | Tracy | | H05K 7/02 |
| 2018/0199468 A1* | 7/2018 | Hall, III | | G02B 6/4246 |
| 2018/0206353 A1* | 7/2018 | Briant | | H05K 5/0069 |
| 2018/0212385 A1* | 7/2018 | Little | | H01R 13/6273 |
| 2018/0338387 A1* | 11/2018 | Park | | G02B 6/4284 |
| 2019/0011631 A1* | 1/2019 | Kobayashi | | G09F 9/00 |
| 2019/0013617 A1* | 1/2019 | Ayzenberg | | H01R 13/6582 |
| 2019/0044299 A1* | 2/2019 | Kazav | | H01R 27/00 |
| 2019/0089088 A1* | 3/2019 | Fernandes | | G02B 6/4292 |
| 2019/0158184 A1* | 5/2019 | Jachetta | | G02B 6/4261 |
| 2019/0163245 A1* | 5/2019 | Kho | | H05K 7/1409 |
| 2019/0182985 A1* | 6/2019 | Gaviola | | H05K 7/20409 |
| 2019/0212509 A1* | 7/2019 | Takeuchi | | H01R 13/627 |
| 2019/0363494 A1* | 11/2019 | Sharf | | H01R 13/6582 |
| 2020/0041729 A1* | 2/2020 | Moriyama | | G02B 6/3814 |
| 2020/0067230 A1* | 2/2020 | Hamauchi | | H01R 13/73 |
| 2020/0113077 A1* | 4/2020 | Tittenhofer | | H05K 5/0256 |
| 2020/0150366 A1* | 5/2020 | Tittenhofer | | G02B 6/4278 |
| 2020/0153163 A1* | 5/2020 | Guetig | | G02B 6/4277 |
| 2020/0278510 A1* | 9/2020 | Zhou | | G02B 6/4261 |
| 2020/0288589 A1* | 9/2020 | Lavoie | | H05K 7/20163 |
| 2020/0309458 A1* | 10/2020 | Chen | | H01L 23/3675 |
| 2021/0066859 A1* | 3/2021 | Rita | | H01R 13/6691 |
| 2021/0072473 A1* | 3/2021 | Wall, Jr. | | H05K 1/0274 |
| 2021/0103108 A1* | 4/2021 | Wall, Jr. | | G02B 6/4261 |
| 2021/0136951 A1* | 5/2021 | Graham | | H05K 7/20736 |
| 2021/0165174 A1* | 6/2021 | Minota | | H04B 10/40 |
| 2021/0165176 A1* | 6/2021 | Chang | | G02B 6/4257 |
| 2021/0247577 A1* | 8/2021 | Hsiao | | H05K 7/2039 |
| 2021/0263247 A1* | 8/2021 | Bechtolsheim | | G02B 6/4284 |
| 2021/0333485 A1* | 10/2021 | Lee | | H01R 13/6581 |
| 2022/0082771 A1* | 3/2022 | Galbraith | | G02B 6/4269 |
| 2022/0102919 A1* | 3/2022 | Doye | | G02B 6/4261 |
| 2022/0248561 A1* | 8/2022 | Mao | | H05K 7/20445 |
| 2023/0105368 A1* | 4/2023 | Sharf | | H01R 13/6587 |
| | | | | 439/78 |
| 2023/0137375 A1* | 5/2023 | Shabtay | | H04B 1/036 |
| | | | | 439/487 |
| 2023/0228956 A1* | 7/2023 | Kung | | G02B 6/3814 |
| | | | | 385/92 |
| 2023/0253733 A1* | 8/2023 | Chang | | H01R 13/502 |
| | | | | 439/345 |
| 2023/0253739 A1* | 8/2023 | Long | | H01R 13/6587 |
| | | | | 439/78 |
| 2023/0375793 A1* | 11/2023 | Winzer | | G02B 6/428 |
| 2023/0397374 A1* | 12/2023 | Park | | H05K 7/1487 |

* cited by examiner

DETAIL C

DETAIL C

NETWORK INTERFACE DEVICE HAVING A FRAME WITH A SLOPED TOP WALL PORTION

FIELD OF THE INVENTION

The present invention relates to the field of network interface devices and, more particularly, to frames for network interface devices.

BACKGROUND OF THE INVENTION

Typically, network devices, e.g., network switch devices, include receptacle cages configured to receive network interface devices, e.g., small form-factor pluggable (SFP) devices. In operation, network interface devices typically produce heat that may cause reduction in the performance of the network interface devices. In order to dissipate heat from the network interface devices, heatsinks are typically disposed on top of the receptacle cages. In order to improve dissipation of heat from the network interface devices, a thermal interface material (e.g., thermal pad, phase change material, thermally conductive polymer coating or any other suitable material) may be disposed on bottom surfaces of the heatsinks. When the network interface devices are inserted into the receptacle cages, frames of the network interface devices may damage (e.g., scratch or peel off) the thermal interface material disposed on the bottom surfaces of the heatsinks. The damaged thermal interface material may leak and may damage the network interface devices and/or electronic components within the receptacle cages.

SUMMARY OF THE INVENTION

Some embodiments of the present invention may provide a network interface device which may include: an elongated frame having a first end, a second end, and, between the first and second ends, a top wall, a bottom wall opposing the top wall, a first lateral wall, and a second lateral wall opposing the first lateral wall; wherein the top wall includes: a first longitudinal portion that is adjacent to the first end of the frame; and a second longitudinal portion that is adjacent to the second end of the frame and whose outer surface slopes towards its inner surface in a direction of the second end of the frame. The inner surface of the second longitudinal portion may be substantially parallel to the bottom wall of the frame. At least part of the outer surface of the second longitudinal portion of the top wall of the frame may be flat. At least part of the outer surface of the second longitudinal portion of the top wall of the frame may be convex. The outer surface of the second longitudinal portion of the top wall may include both a flat portion that is adjacent to the second end of the frame; and a convex portion that is disposed between the flat portion of the outer surface of the second longitudinal portion of the top wall and an outer surface of the first longitudinal portion of the top wall. The outer surface of the second longitudinal portion may slope towards the inner surface of the second longitudinal portion at an angle of from 5 to 10 degrees. A free edge of the outer surface of the second longitudinal portion of the top wall at the second end of the frame may be rounded. The frame may include a bore formed through the second longitudinal portion of the top wall of the frame. The bore may include a side wall. An upper edge of the side wall of the bore may be rounded where it meets the outer surface of the second longitudinal portion of the top wall. The upper edge of the side wall of the bore may be offset from a plane of an outer surface of the first longitudinal portion of the top wall towards the inner surface of the second longitudinal portion of the top wall. The network interface device may be a small form factor pluggable device.

Some embodiments of the present invention may provide a network interface device, which may include: a frame having a top frame wall; and a fins assembly, the fins assembly comprising: a bottom wall disposed on the top frame wall; a top wall substantially parallel to the bottom wall, and a plurality of substantially parallel longitudinal fins connected between the top wall and the bottom wall, wherein the top wall comprises an extension projecting from a free end of the top wall, the projecting extension being inclined with respect to the top wall towards the top frame wall. At least part of an outer surface of the projecting extension may be flat. At least part of an outer surface of the projecting extension may be convex. The frame may have a first lateral frame wall and a second lateral frame wall that extend above the top frame wall, wherein the fins assembly may be disposed between the first lateral frame wall and the second lateral frame wall. The first lateral frame wall and the second lateral frame wall may extend above the top wall of the fins assembly. Each of top surfaces of the first lateral frame wall and the second lateral frame wall may be sloped at its respective free end towards the top frame wall. The network interface device may be a small form factor pluggable device.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
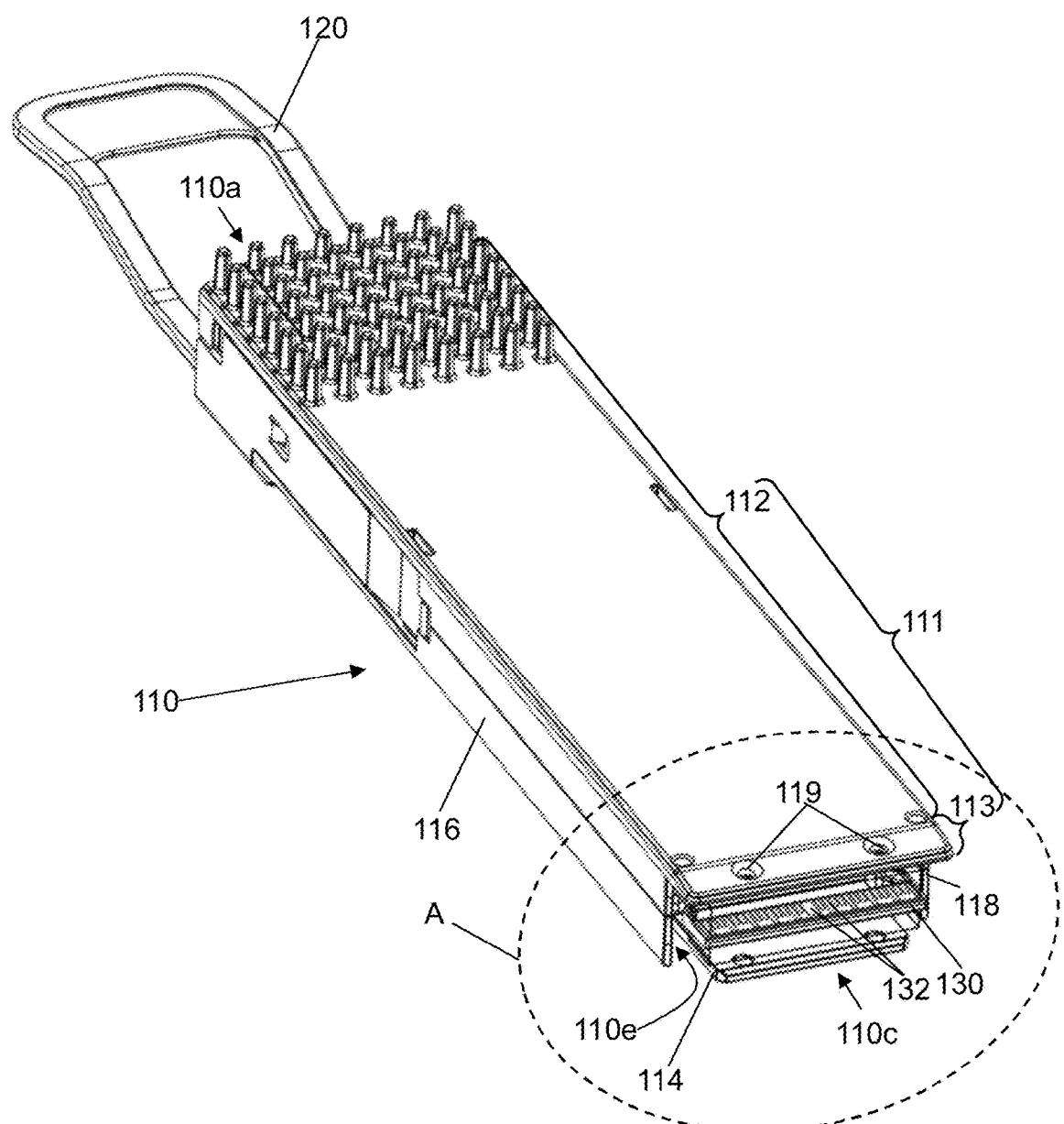
FIG. 1 is a three-dimensional (3D) perspective diagram of a network interface device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some embodiments of the present invention may prevent frames of network interface devices from damaging a thermal interface material during insertion of the network interface devices into receptacle cages of an electronic device.

Reference is made to FIG. 1, which is a 3D diagram of a network interface device 100, according to some embodiments of the invention.

Figure 2:
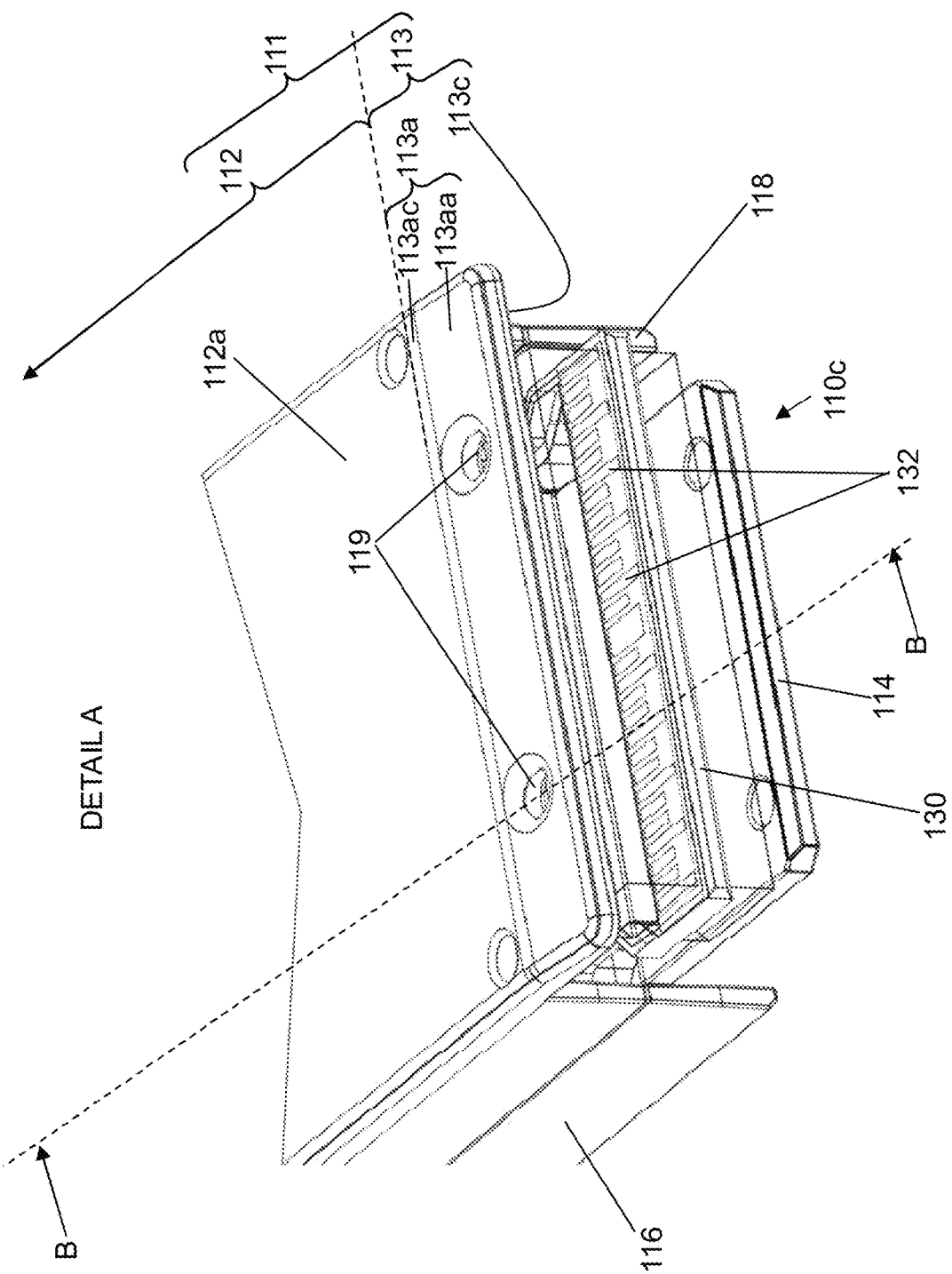
FIG. 2 is a 3D perspective diagram of an enlarged perspective portion A of FIG. 1, according to some embodiments of the invention.

Reference is also made to FIG. 2, which is a 3D diagram of an enlarged portion A of FIG. 1, according to some embodiments of the invention.

Figure 3:
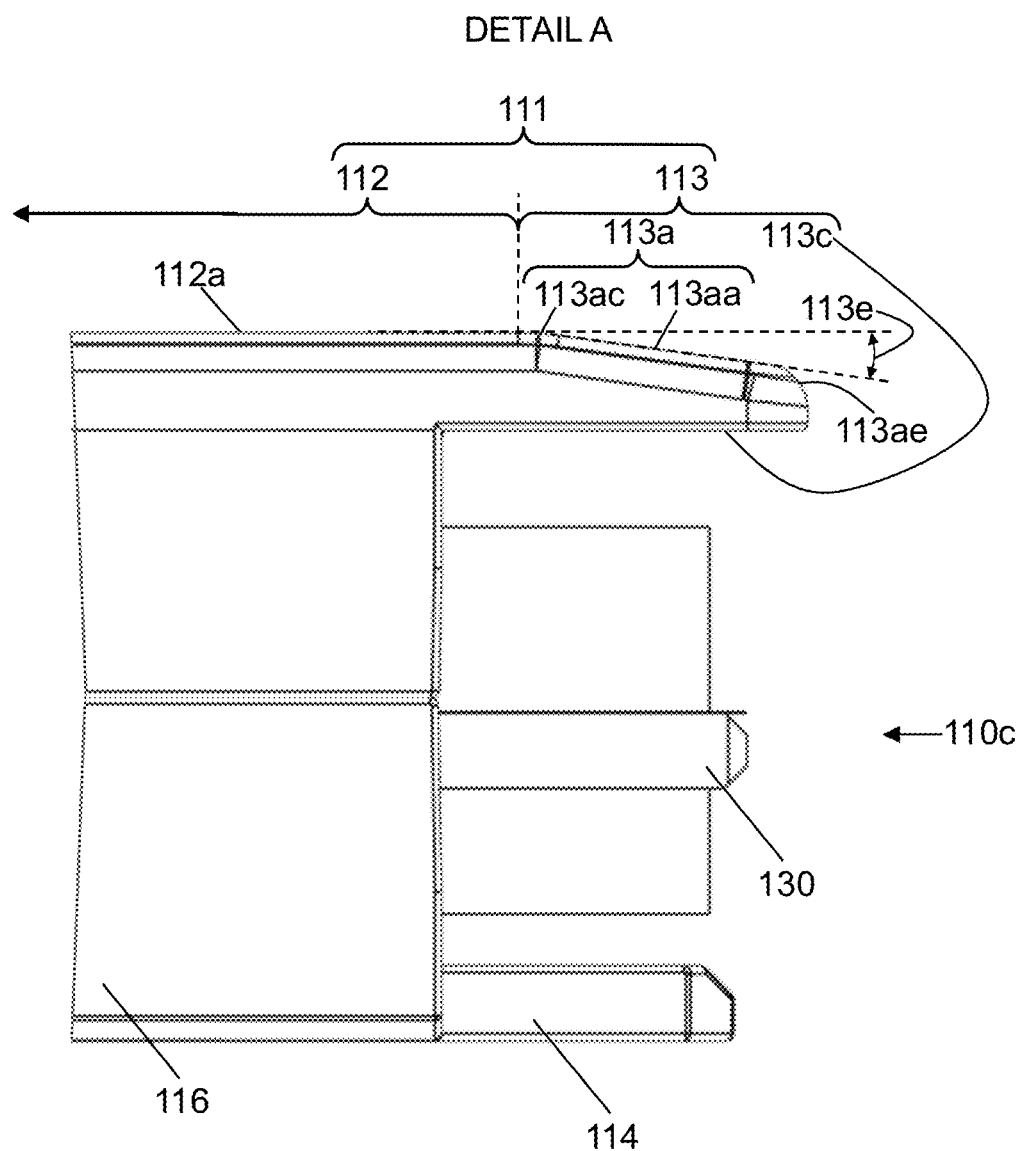
FIG. 3 is a schematic side view of an enlarged portion A of FIG. 1, according to some embodiments of the invention.

Reference is also made to FIG. 3, which is a schematic side view of enlarged portion A of FIG. 1, according to some embodiments of the invention.

Figure 4:
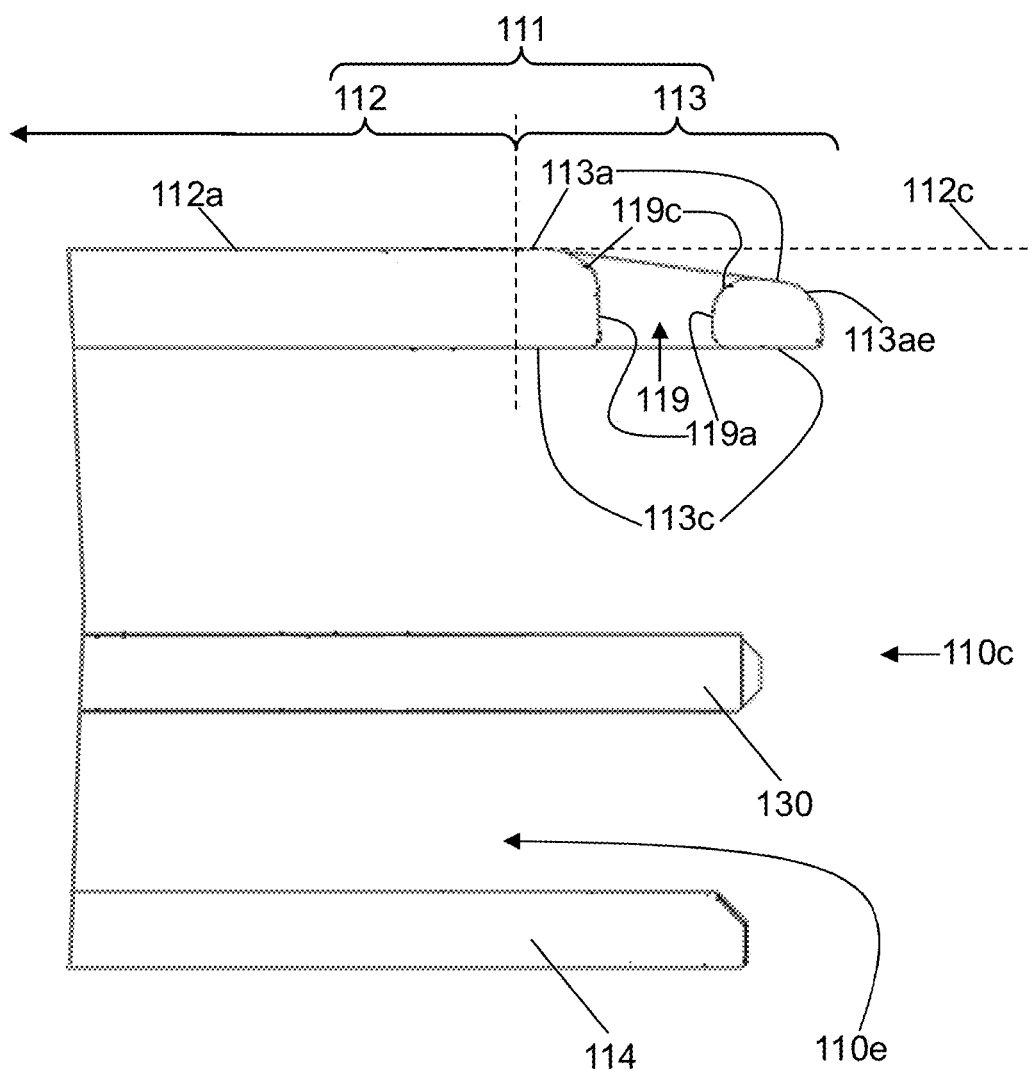
FIG. 4 is a schematic cross-sectional view of an enlarged portion A of FIG. 1 along line B-B of FIG. 2, according to some embodiments of the invention.

Reference is also made to FIG. 4, which is a schematic cross-sectional view of enlarged portion A of FIG. 1 along line BB of FIG. 2, according to some embodiments of the invention.

Network interface device 100 may be a form factor pluggable device, e.g., a small form factor pluggable (SFP) device such as an octal SFP (OSFP) device or any other suitable SFP device known in the art.

Network interface device 100 may include a frame (e.g., shell) 110. Frame 110 may include a first end 110*a* and a second end 110*c*. Frame 110 may be elongated in a direction extending between first end 110*a* and second end 110*c* of frame 110. Between first end 110*a* and second end 110*c*, frame 110 may include a top wall 111, a bottom wall 114 opposite to top wall 111, a first lateral wall 116, and a second lateral wall 118 opposite to first lateral wall 116. When network interface device 100 is inserted into a receptacle cage of an electronic device, bottom wall 114 of frame 110 may face a printed circuit board of the electronic device. Frame 110 may include an interior 110*e* formed between top and bottom walls 111, 114 and between first and second side walls 116, 118 of frame 110.

Network interface device 100 may include a handle 120. Handle 120 may be coupled to frame 110 at first end 110*a* of frame 110. Network interface device 100 may include a printed circuit board (PCB) 130. PCB 130 may be disposed within interior 110*e* of frame 110. PCB 130 may include connectors 132 disposed on PCB 130 adjacent to second end 110*c* of frame 110.

Top wall 111 of frame 110 may include a first longitudinal portion 112 that is adjacent to first end 110*a* of frame 110. Top wall 111 of frame 110 may include a second longitudinal portion 113 that is adjacent to second end 110*c* of frame 110. Second longitudinal portion 113 of top wall 111 may have an outer surface 113*a* and an inner surface 113*c* opposite to outer surface 113*a*. Outer surface 113*a* of second longitudinal portion 113 of top wall 111 may slope towards inner surface 113*c* of second longitudinal portion 113 of top wall 111 of frame 110 in a direction of second end 110*c* of frame 110. Sloped outer surface 113*a* of second longitudinal portion 113 of top wall 111 may ensure smooth insertion of network interface device 100 into an interior of a receptacle cage of an electronic device without damaging a thermal interface material disposed on a bottom surface of a heatsink of the electronic device (e.g., as described below with respect to FIG. 5). Inner surface 113*c* of second longitudinal portion 113 of top wall 111 of frame 110 may be parallel (or substantially parallel) to bottom wall 114 of frame 110 (e.g., as shown in FIGS. 3 and 4). In some embodiments, inner surface 113*c* of second longitudinal portion 113 of top wall 111 is not parallel to bottom wall 114 of frame 110. An outer surface 112*a* of first longitudinal portion 112 of top wall 111 may be parallel (or substantially parallel) to bottom wall 114 of frame 110. A ratio of the length of first longitudinal portion 112 over the length of second longitudinal portion 113 of top wall 111 of frame 110 may be, for example, within a range of 15:1 to 25:1 (e.g., 20:1).

At least part of outer surface 113*a* of second longitudinal portion 113 of top wall 111 may be flat. At least part of outer surface 113*a* of second longitudinal portion 113 of top wall 111 may be convex (e.g., rounded). For example, outer surface 113*a* of second longitudinal portion 113 of top wall 111 may include a flat portion 113*aa* (e.g., as shown in FIGS. 2-3). Flat portion 113*aa* of outer surface 113*a* of second longitudinal portion 113 of top wall 111 may be adjacent to second end 110*c* of frame 110. Flat portion 113*aa* of outer surface 113*a* of second longitudinal portion 113 may slope towards inner surface 113*c* of second longitudinal portion 113 of top wall 111 at an angle 113*e* of from 5 to 10 degrees (e.g., 8 degrees). In the same example, outer surface 113*a* of second longitudinal portion 113 of top wall 111 may include a convex (e.g., rounded) portion 113*ac* (e.g., as shown in FIGS. 2-3). Convex portion 113*ac* of outer surface 113*a* of second longitudinal portion 113 of top wall 111 may be disposed between flat portion 113*aa* of outer surface 113*a* of second longitudinal portion 113 and outer surface 112*a* of first longitudinal portion 112 of top wall 111 of frame 110. Convex portion 113*ac* of outer surface 113*a* of second longitudinal portion 113 of top wall 111 may have a radius of curvature of from 2.00 to 6.00 mm (e.g., 4.00 mm). Convex (e.g., rounded) portion 113*ac* of outer surface 113*a* of second longitudinal portion 113 of top wall 111 may further enhance the smooth insertion of network interface device 100 into the receptacle cage of the electronic device and prevent frame 110 from damaging the thermal interface material disposed on the bottom surface of the heatsink. In another example, outer surface 113a of second longitudinal portion 113 of top wall 111 may include (e.g., instead of convex portion 113ac) a chamfer (e.g., 45 degrees chamfer) disposed between flat portion 113aa of outer surface 113a of second longitudinal portion 113 and outer surface 112a of first longitudinal portion 112 of top wall 111 of frame 110. The chamfer may have the same (or substantially the same) dimensions as convex portion 113ac. In another example, the entire outer surface 113a of second longitudinal portion 113 of top wall 111 of frame 110 may be convex. A free edge 113ae outer surface 113a of second longitudinal portion 113 of top wall 111 of frame 110 may be rounded (e.g., as shown in FIGS. 3-4).

Frame 110 may include one or more bores 119 formed through second longitudinal portion 113 of top wall 111 of frame 110 (e.g., as shown in FIGS. 1-2, 4). One or more bores 119 may be used, for example, to allow a user to observe connectors 132 of PCB 130 therethrough. Each of one or more bores 119 may have a side wall 119a. Side wall 119a of each of one or more bores 119 may have an upper edge 119c. Upper edge 119c of side wall 119a each of one or more bores 119 may be offset from a plane 112c of outer surface 112a of first longitudinal portion 112 of top wall 111 towards inner surface 113c of second longitudinal portion 113 of top wall 111 of frame 110 (e.g., as shown in FIG. 4). Upper edge 119c of side wall 119a each of one or more bores 119 may be rounded where upper edge 119c meets outer surface 113a of second longitudinal portion 113 of top wall 111 of frame 110 (e.g., as shown in FIG. 4). Offsetting upper edge(s) 119c of bore(s) 119 from plane 112c of outer surface 112a of first longitudinal portion 112 towards inner surface 113c of second longitudinal portion 113 of top wall 111 and/or rounding upper edge(s) 119c may further enhance the smooth insertion of network Interface device 100 into the receptacle cage of the electronic device and prevent frame 110 from damaging the thermal interface material disposed on the bottom surface of the heatsink.

Figure 5:
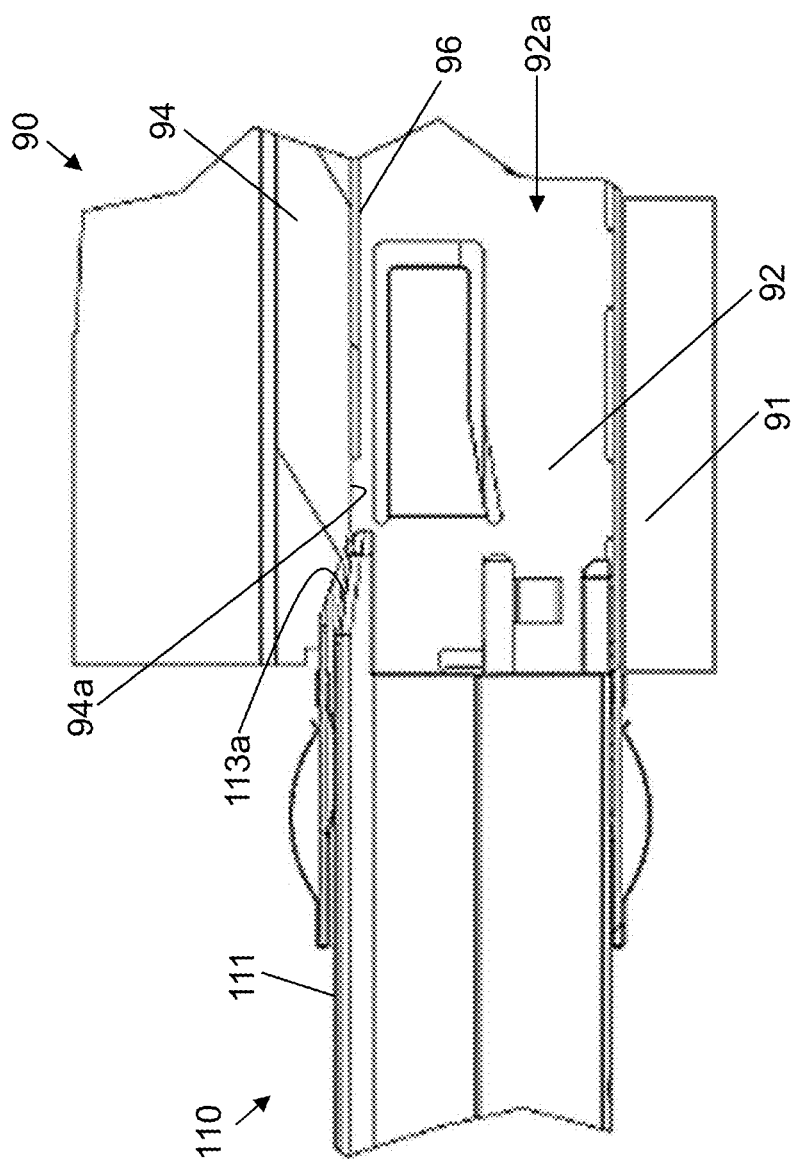
FIG. 5 is a schematic partial cross-sectional view of a part of a receptacle cage of an electronic device, and a schematic side view of a part of the network interface device of FIGS. 1-4 being inserted into the receptacle cage, according to some embodiments of the invention.

Reference is made to FIG. 5, which is a schematic partial cross-sectional view of a part of a receptacle cage 92 of an electronic device 90, and a schematic side view of a part of network interface device 100 of FIGS. 1-4 being inserted into receptacle cage 92, according to some embodiments of the invention.

As schematically shown in FIG. 5, electronic device 90 (e.g., such as network switch device or any other suitable electronic device) may include a PCB 91, a receptacle cage 92 disposed on PCB 91 and having an interior 92a, a heatsink 94 disposed on top of receptacle cage 92, and a thermal interface material 96 (e.g., such as phase change material) disposed on a bottom surface 94a of heatsink 94.

Sloped outer surface 113a of second longitudinal portion 113 of top wall 111 that is adjacent to leading second end 110c of frame 110 may ensure smooth insertion of network interface device 100 into interior 92a of receptacle 92 without damaging thermal interface material 96 disposed on bottom surface 94a of heatsink 94 of electronic device 90. Offsetting upper edge 119c of side walls 119a of each of one or more bores 119 formed through second longitudinal portion 113 of top wall 111 from plane 112c of outer surface 112a of first longitudinal portion 112 of top wall 111 towards inner surface 113c of second longitudinal portion 113 of top wall 111 of frame 110 may further enhance the smooth insertion of network interface device 100 into receptacle 92 while preventing frame 110 from damaging thermal interface material 96. This in contrast to prior art network interface devices having sharp and/or rough leading edges that may damage the thermal interface material during insertion of the prior art network interface devices into receptacle cages of the electronic device.

Figure 6:
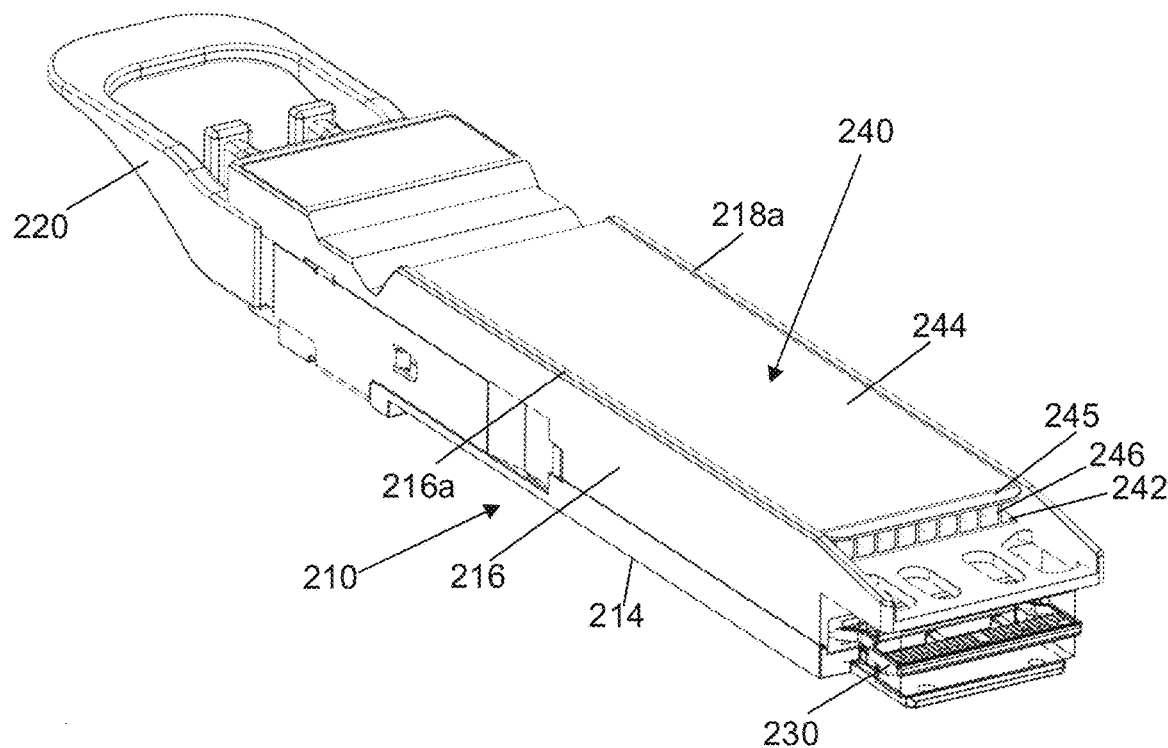
FIG. 6 is a 3D perspective diagram of a network interface device including a frame and a fins assembly, according to some embodiments of the invention.

Reference is made to FIG. 6, which is a 3D diagram of a network interface device 200 including a frame 210 and a fins assembly 240, according to some embodiments of the invention.

Figure 7:
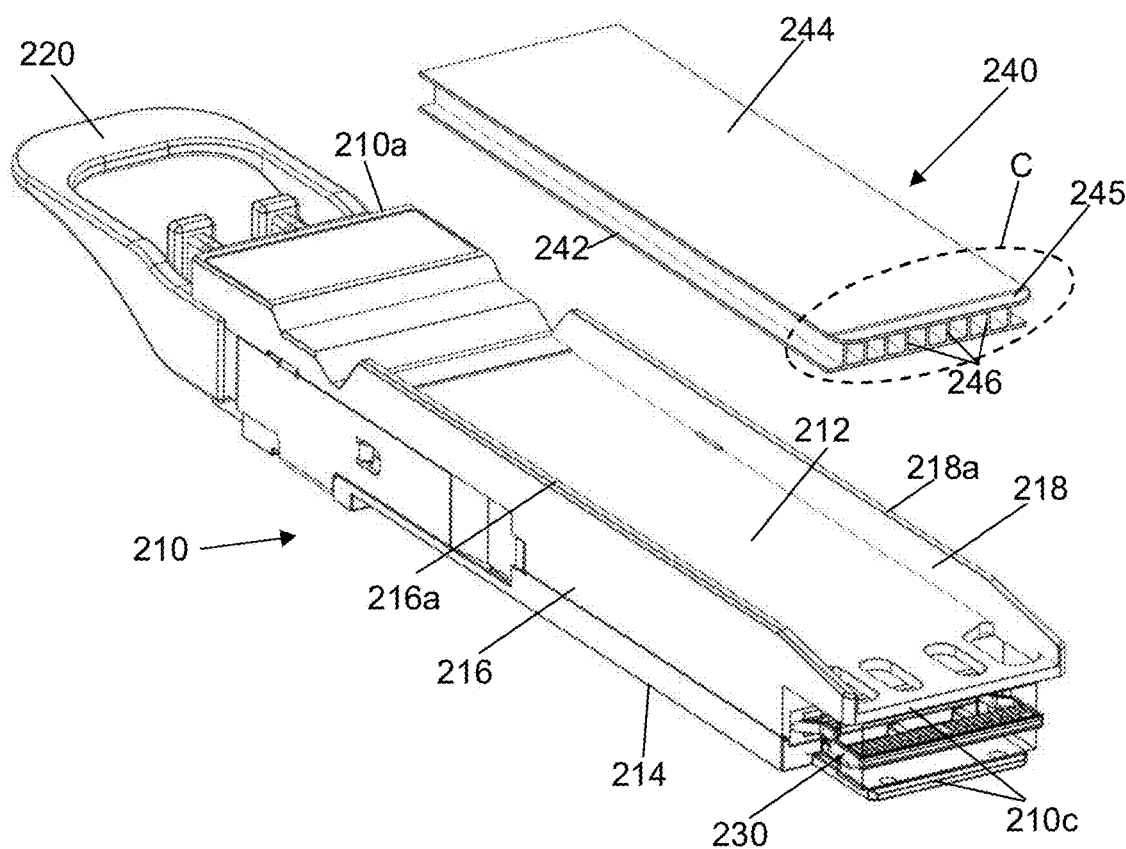
FIG. 7 is an exploded perspective view of the network interface device of FIG. 6, according to some embodiments of the invention.

Reference is also made to FIG. 7, which is an exploded view of network interface device 200 of FIG. 6, according to some embodiments of the invention.

Figure 8:
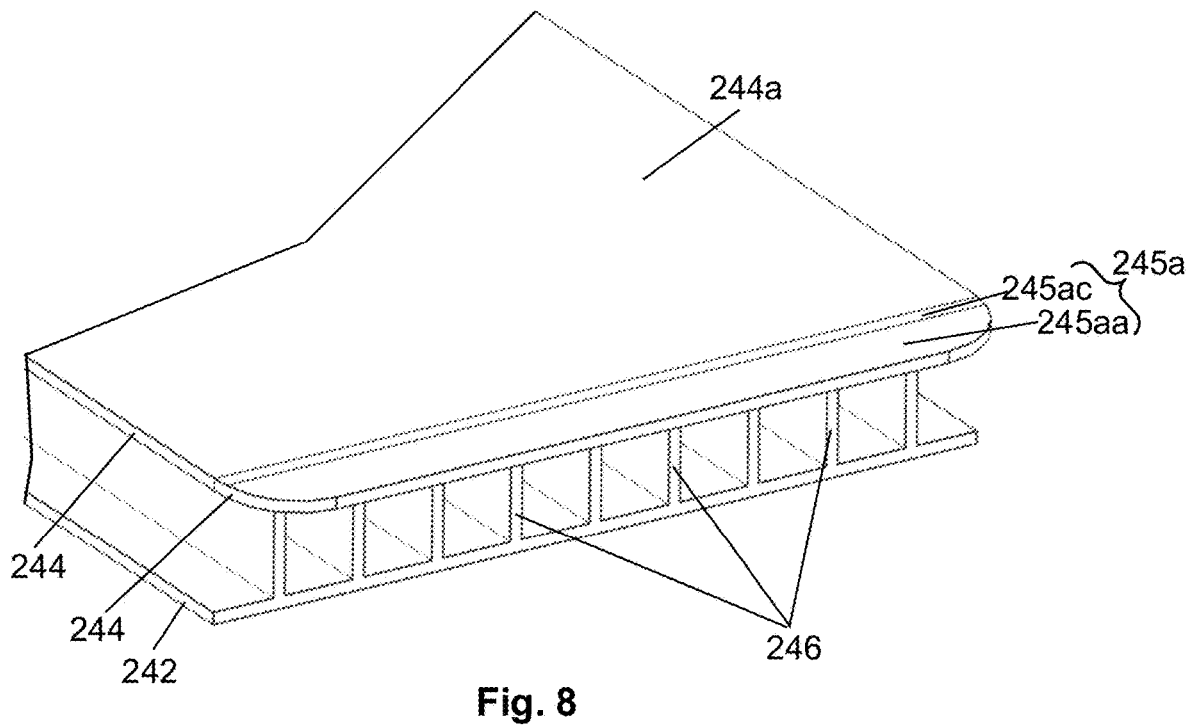
FIG. 8 is a 3D diagram of an enlarged portion C of FIG. 7, according to some embodiments of the invention.

Reference is also made to FIG. 8, which is a 3D diagram of an enlarged portion C of FIG. 7, according to some embodiments of the invention.

Figure 9:
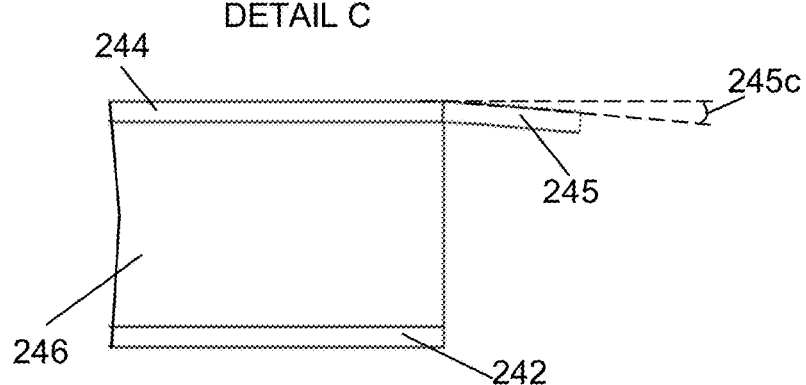
FIG. 9 is a side view of the enlarged portion C of FIG. 7, according to some embodiments of the invention.

Reference is also made to FIG. 9, which is a side view of the enlarged portion C of FIG. 7, according to some embodiments of the invention.

Network interface device 200 may be a form factor pluggable device, e.g., a small form factor pluggable (SFP) device such as an octal SFP (OSFP) device or any other suitable SFP device known in the art.

Network interface device 200 may include a frame (e.g., shell) 210. Frame 210 may include a first end 210a and a second end 210c. Frame 210 may be elongated in a direction extending between first end 210a and second end 210c of frame 210. Between first end 210a and second end 210c, frame 210 may include a top wall 212, a bottom wall 214 opposite to top wall 212, a first lateral wall 216, and a second lateral wall 218 opposite to first lateral wall 216 (e.g., as shown in FIGS. 6 and 7). When network interface device 200 is inserted into a receptacle cage of an electronic device, bottom wall 214 of frame 210 may face a printed circuit board of the electronic device. First lateral wall 216 and second lateral wall 218 may extend above top wall 212 of frame 210 (e.g., as shown in FIGS. 6 and 7). Each of top surface 216a of first lateral wall 216 and of top surface 218a of second lateral wall 218 may be sloped at its respective free end towards top wall 212 of frame 210 (e.g., as shown in FIGS. 6 and 7). Network interface device 200 may include a handle 220. Handle 220 may be coupled to frame 210 at first end 210a of frame 210. Network interface device 200 may include a printed circuit board (PCB) 230. PCB 230 may be disposed within the interior of frame 210.

Network interface device 200 may include a fins assembly 240. Fins assembly 240 may be disposed on top wall 212 of frame 210, e.g., between first lateral wall 216 and second lateral wall 218 of frame 210 (e.g., as shown in FIG. 6). Fins assembly 240 may include a bottom wall 242. Bottom wall 242 of fins assembly 240 may be disposed on top wall 212 of frame 210. Fins assembly 240 may include a top wall 244 that is parallel (or substantially parallel) to bottom wall 242. Fins assembly 240 may include a plurality of parallel (or substantially parallel) longitudinal fins 246 connected between top wall 244 and bottom wall 242 of fins assembly 240 (e.g., as shown in FIGS. 6, 7 and 8). First lateral wall 216 and second lateral wall 218 of fins assembly 240 may extend above top wall 244 of fins assembly 240 (e.g., as shown in FIG. 6).

Top wall 244 of fins assembly 240 may include a projecting extension 245. Projecting extension 245 may project from a free end of top wall 244. Projecting extension 245 may be inclined (e.g., sloped) with respect to top wall 244 of fins assembly 240 towards top wall 212 of frame 210 (e.g., as shown in FIGS. 6, 7, 8 and 9). Projecting extension 245 may be inclined with respect to top wall 244 of fins assembly 240 at an angle 245c (e.g., schematically indicated in FIG. 9) of, for example, from 5 to 15 degrees. At least part of an outer surface 245a of projecting extension 245 may be flat. At least part of an outer surface 245a of projecting extension 245 may be convex. For example, outer surface 245a of projecting extension 245 may include both a flat portion 245aa that is adjacent to a free end of projecting extension 245 and a convex portion 245ac that is disposed between flat portion 245aa of outer surface 245a of projecting extension 245 and an outer surface 244a of top wall 244 of fins assembly 240 (e.g., as shown in FIG. 8).

Sloped (e.g., inclined), and optionally partly convex, projecting extension 245 of top wall 244 of fins assembly 240 projecting from the leading free end of top wall 244 of fins assembly 240 may ensure smooth insertion of network interface device 200 into the interior of the receptacle of the electronic device without damaging the thermal interface material disposed on the bottom surface of the heatsink of the electronic device. This in contrast to prior art network interface devices with fins assemblies having sharp and/or rough leading edges that may damage the thermal interface material during insertion of the prior art network interface devices into receptacle cages of the electronic device.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A network interface device comprising:
a frame having a top frame wall; and
a fins assembly, the fins assembly comprising:
    a bottom wall disposed on the top frame wall;
    a top wall substantially parallel to the bottom wall, and
    a plurality of substantially parallel longitudinal fins connected between the top wall and the bottom wall,
    wherein the top wall comprises an extension projecting from a free end of the top wall, the projecting extension being inclined with respect to the top wall towards the top frame wall.

2. The device of claim 1, wherein at least part of an outer surface of the projecting extension is flat.

3. The device of claim 1, wherein at least part of an outer surface of the projecting extension is convex.

4. The device of claim 1, wherein the frame has a first lateral frame wall and a second lateral frame wall that extend above the top frame wall, and wherein the fins assembly is disposed between the first lateral frame wall and the second lateral frame wall.

5. The device of claim 4, wherein the first lateral frame wall and the second lateral frame wall extend above the top wall of the fins assembly.

6. The device of claim 4, wherein each of top surfaces of the first lateral frame wall and the second lateral frame wall is sloped at its respective free end towards the top frame wall.

7. The device of claim 1, wherein the network interface device is a small form factor pluggable device.

* * * * *